(12) United States Patent
Garcia Briz et al.

(10) Patent No.: US 9,533,589 B2
(45) Date of Patent: Jan. 3, 2017

(54) INTEGRATION OF ELECTRONIC COMPONENTS IN INDUCTIVE POWER TRANSFER SYSTEMS

(71) Applicant: QUALCOMM Incorporated, San Diego, CA (US)

(72) Inventors: Alberto Garcia Briz, Munich (DE); Grzegorz Ombach, Munich (DE); Milenko Stamenic, Munich (DE); Edward Van Boheemen, Munich (DE); Stefan Raabe, Munich (DE); Michael Werner, Markt Schwabn (DE)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 14/252,518

(22) Filed: Apr. 14, 2014

(65) Prior Publication Data
US 2015/0022142 A1 Jan. 22, 2015

Related U.S. Application Data

(60) Provisional application No. 61/847,014, filed on Jul. 16, 2013.

(51) Int. Cl.
*H02J 7/00* (2006.01)
*B60L 11/18* (2006.01)
(Continued)

(52) U.S. Cl.
CPC ........... *B60L 11/182* (2013.01); *B60L 11/1811* (2013.01); *B60L 11/1829* (2013.01);
(Continued)

(58) Field of Classification Search
USPC ........................................................ 320/108
See application file for complete search history.

(56) References Cited

U.S. PATENT DOCUMENTS

2005/0288743 A1  12/2005  Ahn et al.
2007/0247005 A1  10/2007  Tetlow
(Continued)

FOREIGN PATENT DOCUMENTS

| EP | 2620960 A1 | 7/2013 |
|---|---|---|
| JP | 2012120411 A | 6/2012 |
| WO | WO-2012039077 A1 | 3/2012 |

OTHER PUBLICATIONS

International Search Report and Written Opinion—PCT/US2014/041107—ISA/EPO—Dec. 23, 2014.

*Primary Examiner* — Bryce Aisaka
(74) *Attorney, Agent, or Firm* — Knobbe Martens Olson & Bear LLP

(57) ABSTRACT

In a particular embodiment, a wireless power receiver apparatus includes a coil configured to wirelessly receive power via a magnetic field generated by a transmitter. The wireless power receiver apparatus can include a housing that includes a first volume configured to house the coil. The housing can also include a second volume configured to house electronic components. The second volume can be bound by a horizontal shielding member along a first portion of the second volume. The horizontal shielding member can define a horizontal shielding member plane substantially parallel to a plane defined by the coil. The second volume can also be bounded by a vertical shielding member along a second portion of the second volume. The vertical shielding member can define a vertical shielding member plane substantially orthogonal to the plane defined by the coil.

28 Claims, 14 Drawing Sheets

(51) Int. Cl.
*H01F 38/14* (2006.01)
*H02J 7/02* (2016.01)

(52) U.S. Cl.
CPC .......... *B60L 11/1833* (2013.01); *H01F 38/14* (2013.01); *H02J 7/025* (2013.01); *Y02T 10/7005* (2013.01); *Y02T 10/7072* (2013.01); *Y02T 90/122* (2013.01); *Y02T 90/14* (2013.01); *Y10T 29/4902* (2015.01)

(56) References Cited

U.S. PATENT DOCUMENTS

| | | |
|---|---|---|
| 2010/0277120 A1 | 11/2010 | Cook et al. |
| 2011/0128714 A1 | 6/2011 | Terao et al. |
| 2011/0214926 A1 | 9/2011 | Ichikawa |
| 2012/0235636 A1* | 9/2012 | Partovi ................ H02J 7/025 320/108 |
| 2013/0005408 A1 | 1/2013 | Matsui et al. |
| 2013/0038279 A1* | 2/2013 | Seyerle ................ B60R 16/033 320/108 |
| 2013/0249480 A1 | 9/2013 | Paparo, I et al. |

* cited by examiner

INTEGRATION OF ELECTRONIC COMPONENTS IN INDUCTIVE POWER TRANSFER SYSTEMS

CROSS-REFERENCE TO RELATED APPLICATIONS

The present application claims priority to provisional U.S. Application Ser. No. 61/847,014, entitled "Integration of Electronic Components in Inductive Power Transfer Systems," filed Jul. 16, 2013, assigned to the assignee hereof and incorporated herein by reference in its entirety.

FIELD

The present disclosure relates generally to wireless power transfer, and more specifically to devices, systems, and methods related to wireless power transfer to remote systems such as vehicles including batteries, and in particular to magnetic field distribution optimization for integration of electronic components in inductive power transfer systems.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In a particular embodiment, a wireless power receiver apparatus can include a coil configured to wirelessly receive power via a magnetic field generated by a transmitter. The wirelessly received power can be at a level sufficient for powering or charging a load. The wireless power receiver apparatus can also include a housing. The housing can include a first volume configured to house the coil. The housing can also include a second volume different than the first volume. The second volume can be configured to house electronic components. Also, a level of the magnetic field within the second volume can be less than the level of the magnetic field within the first volume. The second volume can be bound by a horizontal shielding member along a first portion of the second volume. The horizontal shielding member can define a horizontal shielding member plane substantially parallel to a plane defined by the coil. The second volume can also be bounded by a vertical shielding member along a second portion of the second volume. The vertical shielding member can define a vertical shielding member plane substantially orthogonal to the plane defined by the coil.

In another particular embodiment, a wireless power receiver apparatus can include means for wirelessly receiving power via a magnetic field generated by a transmitter. The wirelessly received power can be at a level sufficient for powering or charging a load. The wireless power receiver apparatus can also include means for housing the means for wirelessly receiving power. The wireless power receiver apparatus can also include means for housing electronic components. A level of the magnetic field within the means for housing electronic components can be less than the level of the magnetic field within the means for housing the means for wirelessly receiving power.

In another particular embodiment, a method for forming a housing can include locating a coil within a first volume of the housing. The coil can be configured to wirelessly receive power via a magnetic field generated by a transmitter. The wirelessly received power can be at a level sufficient for powering or charging a load. The method can also include locating electronic components within a second volume of the housing different than the first volume of the housing. A level of the magnetic field within the second volume can be less than the level of the magnetic field within the first volume. The second volume can be bound by a horizontal shielding member along a first portion of the second volume. The horizontal shielding member can define a horizontal shielding member plane substantially parallel to a plane defined by the coil. The second volume can also be bound by a vertical shielding member along a second portion of the second volume. The vertical shielding member can define a vertical shielding member plane substantially orthogonal to the plane defined by the coil.

Figure 1:
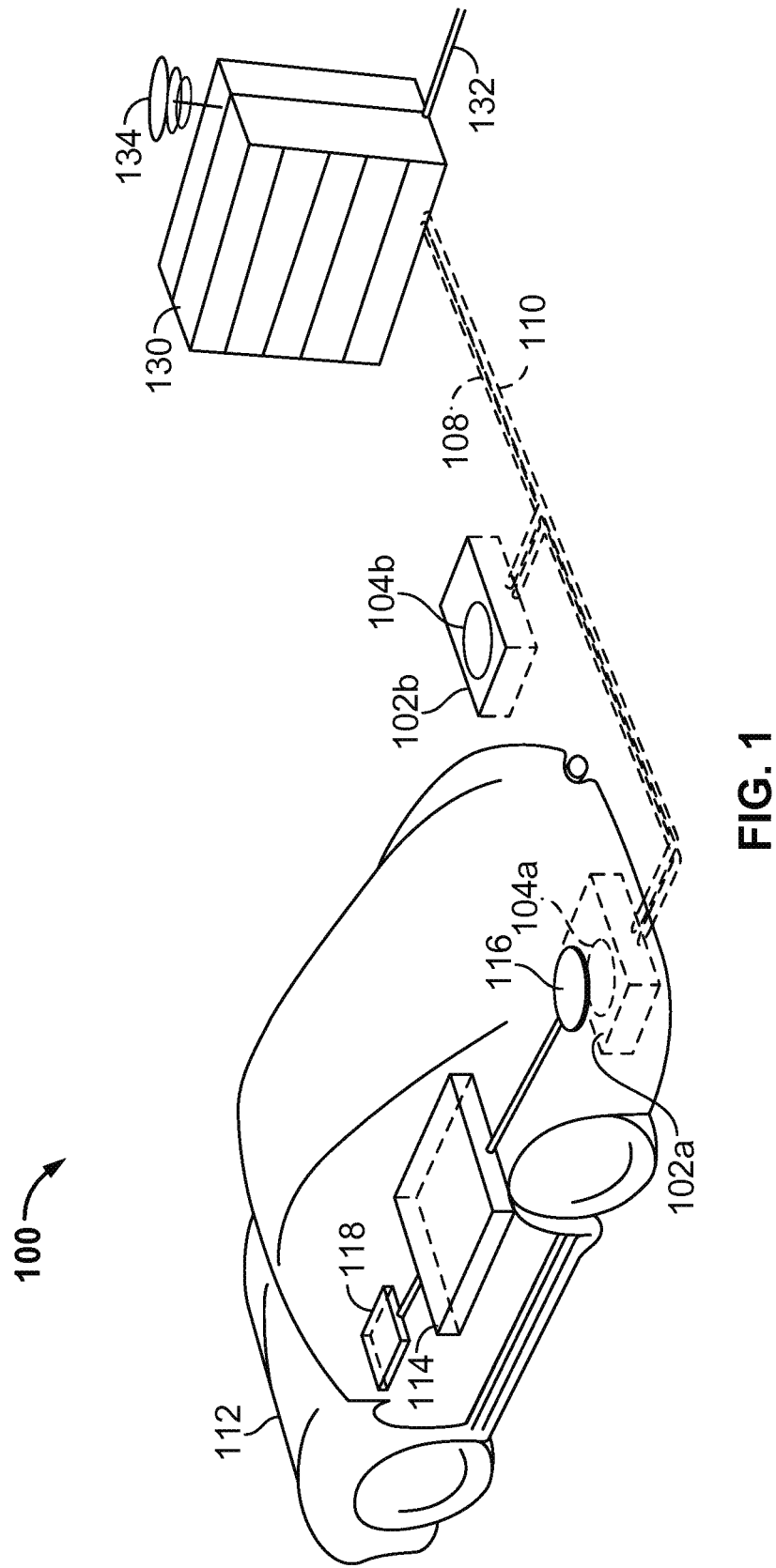
FIG. 1 is a diagram of an exemplary wireless power transfer system for charging an electric vehicle, in accordance with an exemplary embodiment.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments and is not intended to represent the only embodiments which may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. In some instances, some devices are shown in block diagram form.

The detailed description set forth below in connection with the appended drawings is intended as a description of exemplary embodiments and is not intended to represent the only embodiments in which embodiments may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle charging induction coil 116, and an electric vehicle wireless charging system 114. The electric vehicle charging induction coil 116 may interact with the base system induction coil 104a for example, via a region of the electromagnetic field generated by the base system induction coil 104a. In certain embodiments, the electric vehicle charging induction coil can be disposed within a volume of an electric vehicle charging induction coil housing (not illustrated in FIG. 1).

In some exemplary embodiments, the electric vehicle charging induction coil 116 may receive power when the electric vehicle charging induction coil 116 is located in an energy field produced by the base system induction coil 104a. The field corresponds to a region where energy output by the base system induction coil 104a may be captured by an electric vehicle charging induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle charging induction coil 116).

Local distribution center 130 may be configured to communicate with external sources (e.g., a power grid) via a communication backhaul 134, and with the base wireless charging system 102a via a communication link 108.

In some embodiments the electric vehicle charging induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle charging induction coil 116, the base system induction coil 104a, or a combination thereof may have functionality for displacing and moving the induction coils 116 and 104a relative to each other to more accurately orient them and develop more efficient coupling there between.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
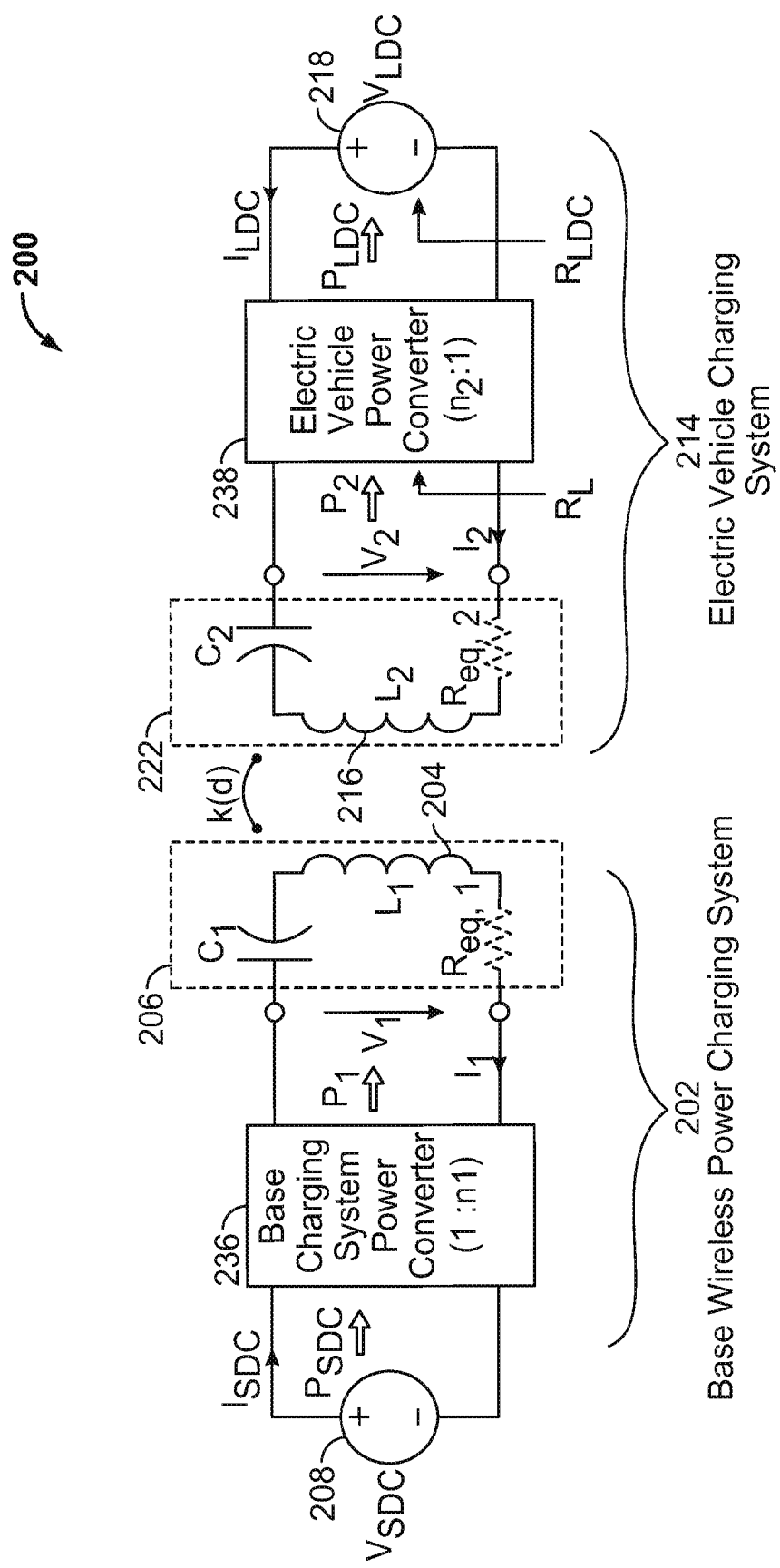
FIG. 2 is a schematic diagram of exemplary core components of the wireless power transfer system of FIG. 1 in accordance with an exemplary embodiment.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle charging induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle charging induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to the electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle charging induction coil 216 may be tuned to substantially the same frequencies and may be positioned within the near-field of an electromagnetic field transmitted by one of the base system induction coil 204 and the electric vehicle charging induction coil 216. In this case, the base system induction coil 204 and electric vehicle charging induction coil 216 may become coupled to one another such that power may be transferred to the electric vehicle receive circuit 222 including capacitor $C_2$ and electric vehicle charging induction coil 216. The capacitor $C_2$ may be provided to form a resonant circuit with the electric vehicle charging induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle charging induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle charging induction coil 216 may be included in an electric vehicle charging system 214 that is part of electric vehicle 112 or part of the battery pack (not shown). The electric vehicle charging system 214 may also be configured to provide power wirelessly through the electric vehicle charging induction coil 216 to the base wireless power charging system 202 to feed power back to the grid. Each of the electric vehicle charging induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle charging induction coil 216 to the electric vehicle power converter 238. Disconnecting the electric vehicle charging induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle charging induction coil 216 couples to the radiated field and generates output power for storage or consumption by the electric vehicle 112. As described above, in some embodiments, the base system induction coil 204 and electric vehicle charging induction coil 216 are configured according to a mutual resonant relationship such that the resonant frequency of the electric vehicle charging induction coil 216 and the resonant frequency of the base system induction coil 204 are very close or substantially the same. Transmission losses between the base wireless power charging system 202 and electric vehicle charging system 214 are minimal when the electric vehicle charging induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle charging induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
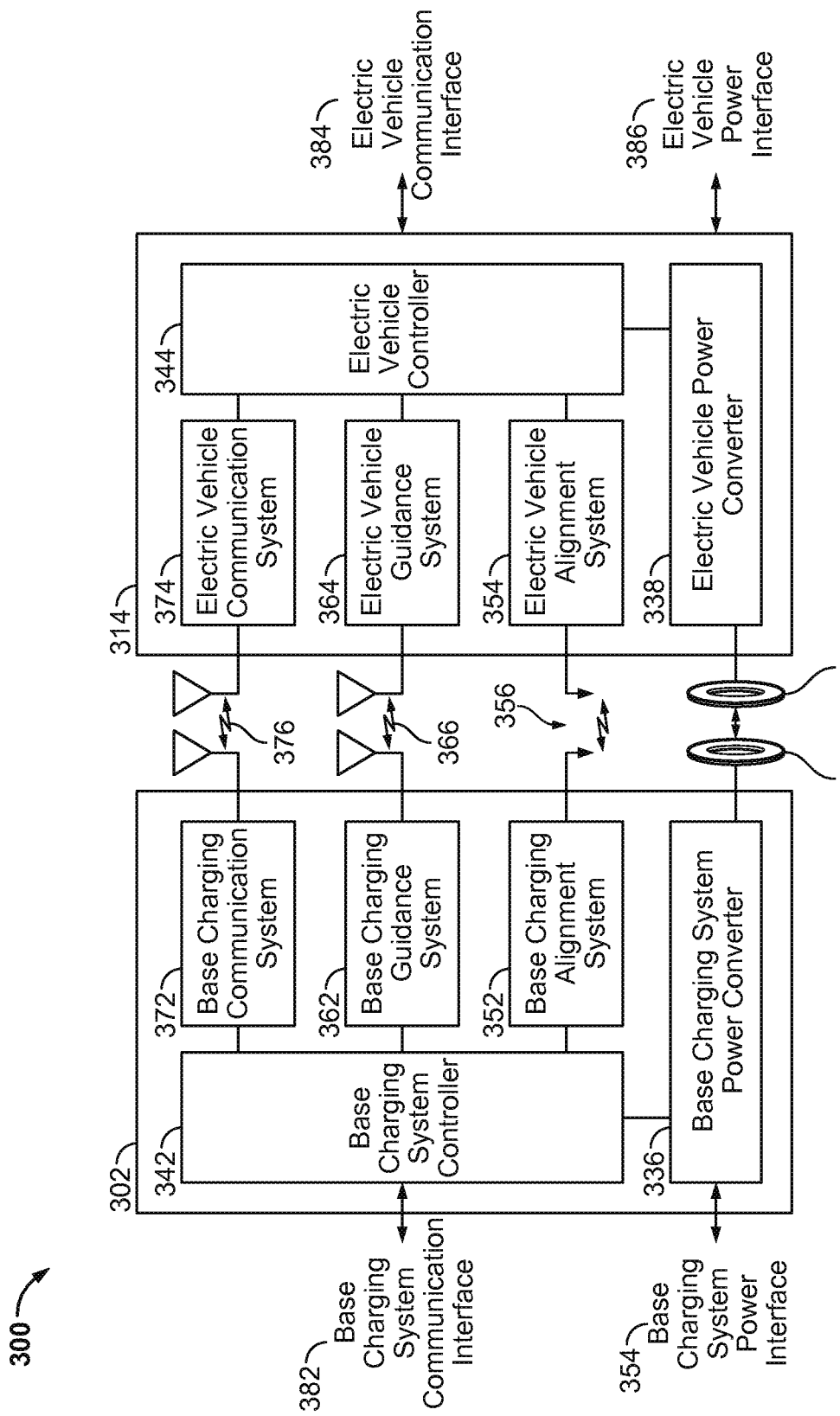
FIG. 3 is a diagram showing exemplary core and ancillary components of the wireless power transfer system of FIG. 1.

FIG. 3 is a diagram showing exemplary core and ancillary components of the wireless power transfer system 300 of FIG. 1. The wireless power transfer system 300 illustrates a communication link 376, a guidance link 366, and alignment system link 356 between base charging alignment system 352 and electric vehicle alignment system 354 for the base system induction coil 304 and electric vehicle charging induction coil 316. As described above with reference to FIG. 2, and assuming energy flow towards the electric vehicle 112, in FIG. 3 a base charging system power interface 380 may be configured to provide power to a charging system power converter 336 from a power source, such as an AC or DC power supply (not illustrated). The base charging system power converter 336 may receive AC or DC power from the base charging system power interface 380 to excite the base system induction coil 304 at or near its resonant frequency. The electric vehicle charging induction coil 316, when in the near field coupling-mode region, may receive energy from the near field coupling mode region to oscillate at or near the resonant frequency. The electric vehicle power converter 338 converts the oscillating signal from the electric vehicle charging induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may communicate via a base charging system communication interface 382 to other systems (not shown) such as, for example, a computer, and a power distribution center, or a smart power grid. The electric vehicle controller 344 may communicate via an electric vehicle communication interface 384 to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 356 to provide a feedback mechanism for more closely aligning the base system induction coil 304 and electric vehicle charging induction coil 316, either autonomously or with operator assistance. Similarly, a base charging guidance system 362 may communicate with an electric vehicle guidance system 364 through a guidance link 366 to provide a feedback mechanism to guide an operator in aligning the base system induction coil 304 and electric vehicle charging induction coil 316. In addition, there may be separate general-purpose communication links 376 (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems (not illustrated). For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle charging induction coil 316 from moving to a particular height and/or position to achieve coupling, and safety sensors for use with systems to perform a reliable, damage free, and safe operation of the system. For example, a safety sensor may include a sensor for detection of presence of animals or children approaching a electric vehicle charging induction coils 316 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 4:
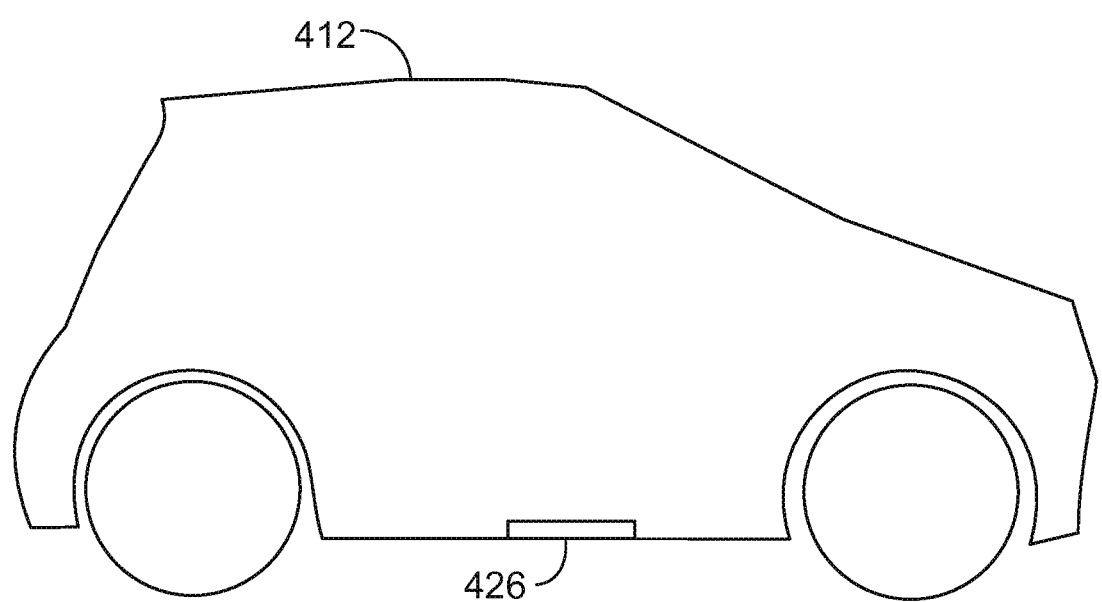
FIG. 4 illustrates an electric vehicle charging induction coil housing along a lower surface of an electric vehicle that can be utilized in the wireless power transfer system of FIG. 1, in accordance with an exemplary embodiment.

The wireless power transfer system 100 described may be used with a variety of electric vehicles 112 compatible with the wireless power transfer system 100 of FIG. 1. FIG. 4 illustrates an electric vehicle charging induction coil housing 426 disposed in an electric vehicle 412 compatible with the wireless power transfer system 100 of FIG. 1 in accordance with an exemplary embodiment. In FIG. 4, the electric vehicle charging induction coil housing 426 is disposed along with a lower surface of the electric vehicle 412. The electric vehicle charging induction coil may form part of a system that powers the electric vehicle including power conversion circuitry, and other control and communications functions as needed for efficient and safe wireless energy transfer between a ground-based wireless charging unit and the electric vehicle battery unit.

It may be useful for the electric vehicle charging induction coil housing 426 to be integrated flush with a lower surface of the electric vehicle 412 so that there are no protrusive parts and so that the specified ground-to-vehicle body clearance may be maintained.

In some embodiments, and with reference to FIG. 1, the base system induction coil 104a and the electric vehicle charging induction coil 116 may be each in a fixed position with the induction coils brought within a near-field coupling region by overall placement of the electric vehicle charging induction coil 116 relative to the base wireless charging system 102a. However, in order to perform energy transfer rapidly, efficiently, and safely, the distance between the base system induction coil 104a and the electric vehicle charging induction coil 116 may need to be reduced to improve coupling. Thus, in some embodiments, the base system induction coil 104a and/or the electric vehicle charging induction coil 116 may be deployable and/or moveable to bring them into better alignment.

Figure 5A:
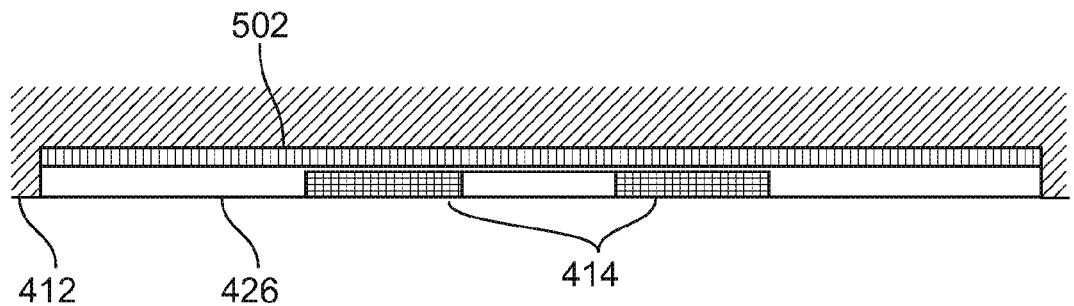
FIG. 5A illustrates a detailed view of the electric vehicle charging induction coil housing of FIG. 4 in accordance with an exemplary embodiment.

FIG. 5A illustrates a detailed view of an electric vehicle charging induction coil housing 426 flush with a lower surface of an electric vehicle 412, in accordance with exemplary embodiments. In FIG. 5A, the electric vehicle housing induction coil housing 426 can house an electric vehicle charging induction coil 414 and a ferrite tile assembly 502. The ferrite tile assembly can include one or more ferrite tiles to enhance coupling and to reduce eddy currents (heat dissipation) in the electric vehicle charging induction coil housing 426.

Figure 5B:
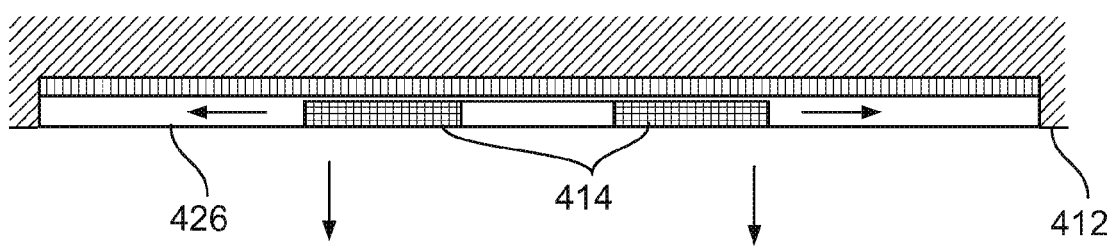
FIG. 5B illustrates an exemplary embodiment of how the electric vehicle charging induction coil of FIG. 5A may be movable.

FIG. 5B illustrates an embodiment where the electric vehicle charging induction coil 414 of FIG. 5A may be movable. The electric vehicle charging induction coil 414 can be moved within the electric vehicle charging induction coil housing 426 in order to better align with a base system induction coil (not illustrated in FIG. 5B). Furthermore, in certain embodiments, the electric vehicle charging induction coil housing 426 can be moved, such as but not limited to in a downward direction away from the underside of the electric vehicle 412. Although specific configurations of electric vehicle charging induction coil housing flush with the surface of an electric vehicle are discussed above, an electric vehicle charging induction coil housing not flush with a surface of an electric vehicle can also have similar properties in accordance with different embodiments. For example, an electric vehicle charging induction coil housing that is not flush with an electric vehicle can be moveable and/or include an electric vehicle charging induction coil that is movable.

Although specific configurations for a using an electric vehicle charging induction coil to charge an electric vehicle are discussed above, an electric vehicle can be charged in many different ways in accordance with different embodiments.

Aspects of the integration of optimized volumes within the electric vehicle charging induction coil housing are discussed below.

Magnetic Field Distribution Optimized Electronic Component Integration

A magnetic field generated during inductive power transfer can be deleterious for the electronic components of an inductive power transfer system, such as but not limited to by causing overheating and malfunction of the electronic components. In certain embodiments, the magnetic flux generated by an inductive power transfer system can be calibrated to where certain volumes or spaces of a housing (such as but not limited to the electric vehicle charging induction coil housing or a base system induction coil housing) that includes a coil (such as but not limited to the electric vehicle charging induction coil or a base system induction coil) of the inductive power transfer system can be optimized to experience a reduced magnetic field. Electronic components (such as but not limited to power electronics components) can be located in these optimized volumes that experience reduced magnetic fields. Additional examples of electronic components can include circuit elements, such as but not limited to resistors, capacitors, diodes and switches. Furthermore, the electronic components within an optimized volume that experiences a reduced magnetic field can also enjoy a partial or total shielding (by a material whose qualities reduces the penetration of a magnetic field through the material relative to other materials) to improve their performance. In particular embodiments, the need for transmission of power through the vehicle can be reduced by locating certain electronic components within the optimized volume close to the electric vehicle charging induction coil.

Figure 6:
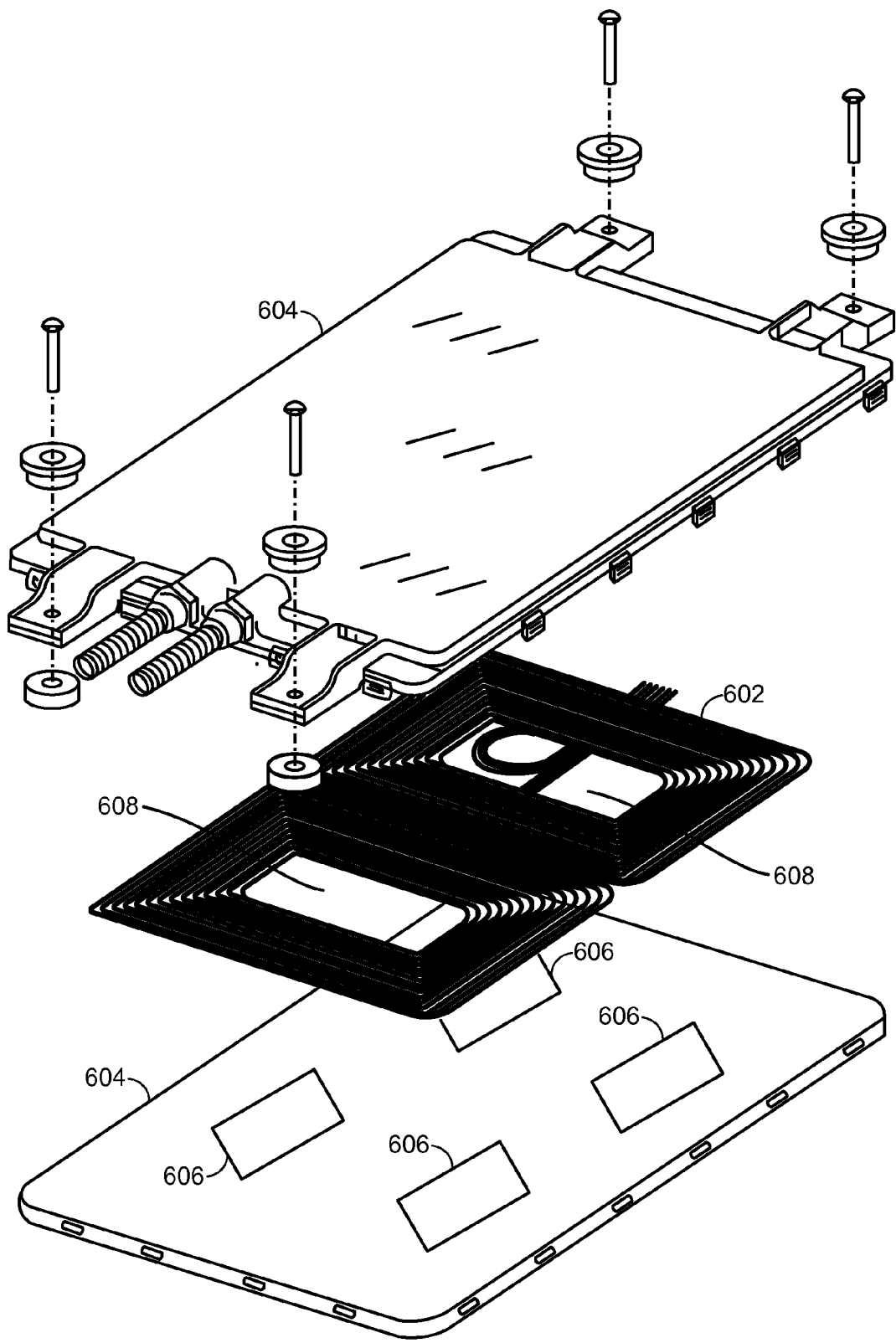
FIG. 6 is an exploded perspective view of components of an electric vehicle charging induction coil housing of FIG. 1 in accordance with an exemplary embodiment.

FIG. 6 is an exploded perspective view of components of an electric vehicle charging induction coil housing of FIG. 1 with optimized volumes in accordance with an exemplary embodiment. The exploded perspective view illustrates an electric vehicle charging induction coil housing 604 that includes the electric vehicle charging induction coil 602 and optimized volumes 606 that include electronic components. During operation of a wireless power transfer system, the electric vehicle charging induction coil 602 can experience a focused magnetic field that passes through the center region 608 of the electric vehicle charging induction coil 602. With a focused magnetic field through the center region of the electric vehicle charging induction coil, regions that are not within the center region of the electric vehicle charging induction coil can experience a reduced magnetic field relative to the center region of the electric vehicle charging induction coil. In the illustrated embodiment, the optimized volumes 606 are designated at a region adjacent to the electric vehicle charging induction coil but not within the center regions of the electric vehicle charging induction coil.

Figure 7:
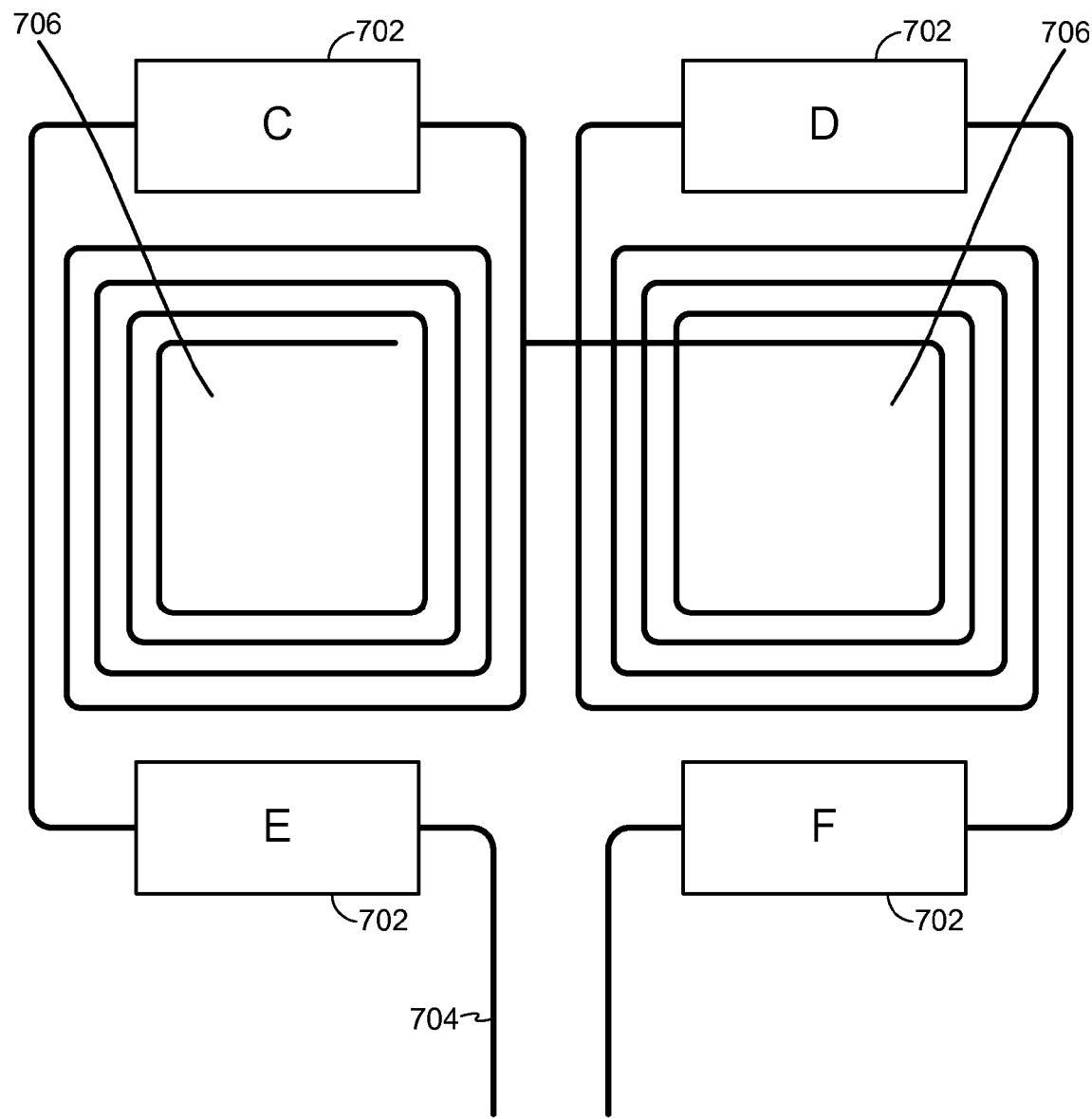
FIG. 7 is a diagram of the location of optimized volumes for electronic components relative to an electric vehicle charging induction coil of an electric vehicle charging induction coil housing of FIG. 1 in accordance with an exemplary embodiment.

FIG. 7 is a diagram of the location of optimized volumes for electronic components relative to an electric vehicle charging induction coil of an electric vehicle charging induction coil housing of FIG. 1 in accordance with an exemplary embodiment. The diagram illustrates that the optimized volumes ("C", "D", "E" and "F") 702 are located along the length of the electric vehicle charging induction coil 704 but not in the center regions 706 of the electric vehicle charging induction coil 704. Thereby, the electronic components of the optimized volumes 702 can experience a reduced magnetic field relative to being located in the center region of the electric vehicle charging induction coil.

Figure 8A:
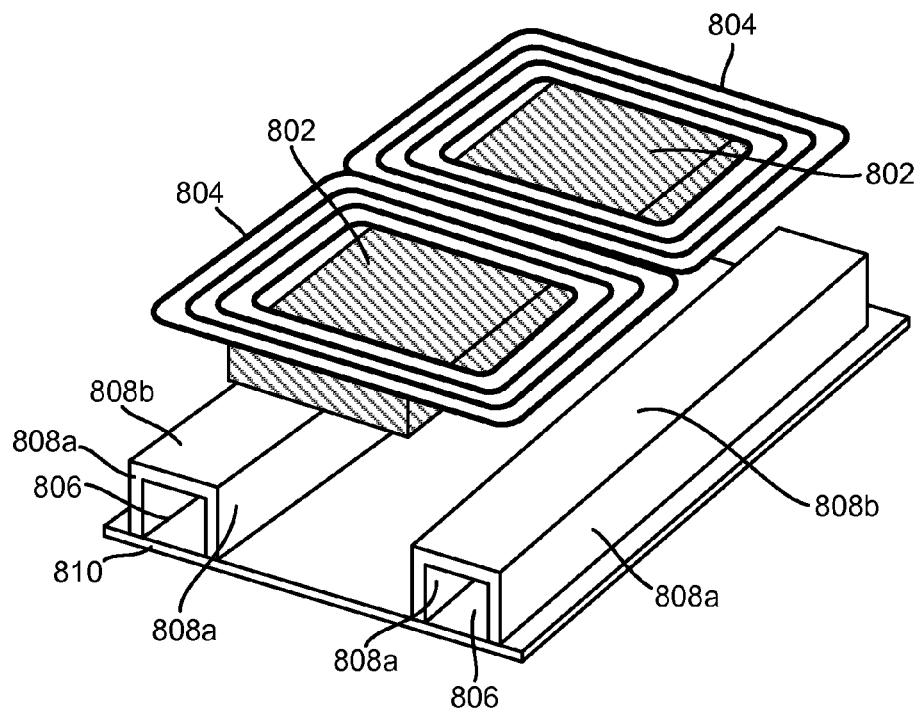
FIG. 8A is a diagram of a configuration for shielded optimized volumes along three portions of each optimized volume for electronic components in the electric vehicle charging induction coil housing of FIG. 1 in accordance with an exemplary embodiment.

FIG. 8A is a diagram of a configuration for shielded optimized volumes along three portions of each optimized volume for electronic components in the electric vehicle charging induction coil housing of FIG. 1 in accordance with an exemplary embodiment. The diagram illustrates that the optimized volumes 806 are shielded along three portions of each optimized volume with shielding members composed of a material whose qualities reduces the penetration of a magnetic field through the material. As illustrated, the optimized volumes include two vertical shielding members 808a along two portions of each optimized volume. Each vertical shielding member 808a can define a vertical shielding member plane substantially orthogonal to a plane defined by the electric vehicle charging induction coil 804. The optimized volumes also include a horizontal shielding member 808b along another portion of each optimized volume. Each horizontal shielding member can define a horizontal shielding member plane substantially parallel to the plane defined by the electric vehicle charging induction coil 804. Thereby, the electronic components within the optimized volume 806 can experience a reduced magnetic field relative to electronic components located in a region not enclosed with the material with reduced magnetic field penetration. Also, the optimized volumes 806 are located in a region that experiences a reduced magnetic field relative to other regions, such as but not limited to a center region 802 of the electric vehicle charging induction coil 804. Additionally, the optimized volumes 806 can be oriented on the electric vehicle charging induction coil housing 810.

Figure 8B:
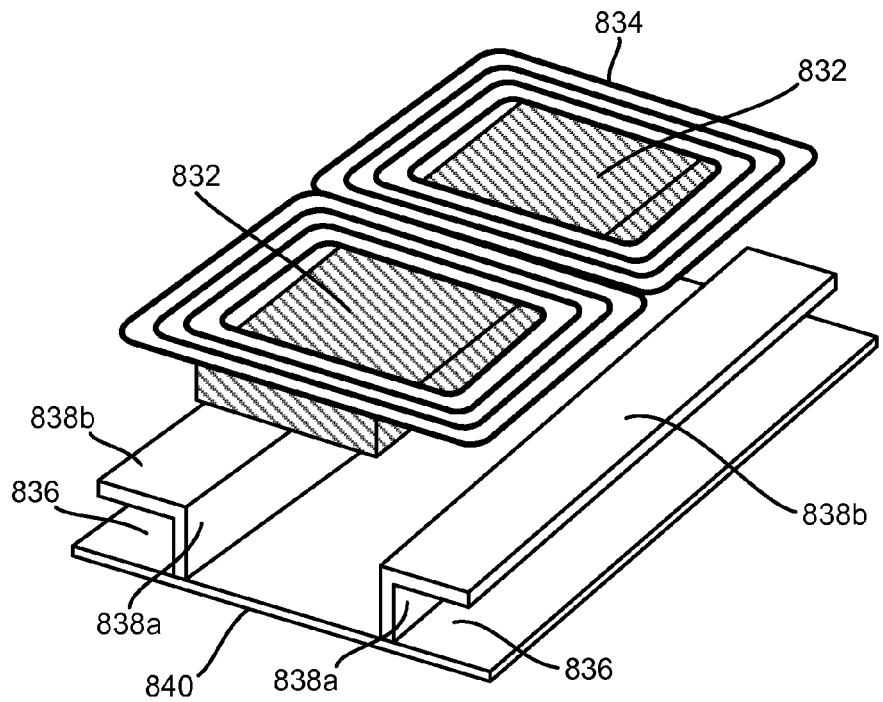
FIG. 8B is a diagram of a configuration for shielded optimized volumes along two portions of each optimized volume for electronic components in the electric vehicle charging induction coil housing of FIG. 1 in accordance with an exemplary embodiment.

FIG. 8B is a diagram of a configuration for shielded optimized volumes along two portions of each optimized volume for electronic components in the electric vehicle charging induction coil housing of FIG. 1 in accordance with an exemplary embodiment. The diagram illustrates that the optimized volumes 836 are shielded on along two portions of each optimized volume with vertical shielding member 838a. The vertical shielding members 838a each define a vertical shielding member plane substantially orthogonal to the plane defined by the electric vehicle charging induction coil 834. Each optimized volume 836 also includes a horizontal shielding member 838b. Each horizontal shielding member 838b defines a horizontal shielding member plane substantially parallel to a plane defined by the electric vehicle charging induction coil 834. Both shielding members 838a, 838b are of the material 838 whose qualities reduce the penetration of a magnetic field through the material, thereby allowing the electronic components within the optimized volume 836 to experience a reduced magnetic field relative to electronic components located in a region not shielded with the material. Also, the optimized volume 836 is located in a region that experiences a reduced magnetic field relative to other regions, such as but not limited to a center region 832 of the electric vehicle charging induction coil 834. Additionally, the optimized volumes 836 can be oriented on the electric vehicle charging induction coil housing 840.

Figure 8C:
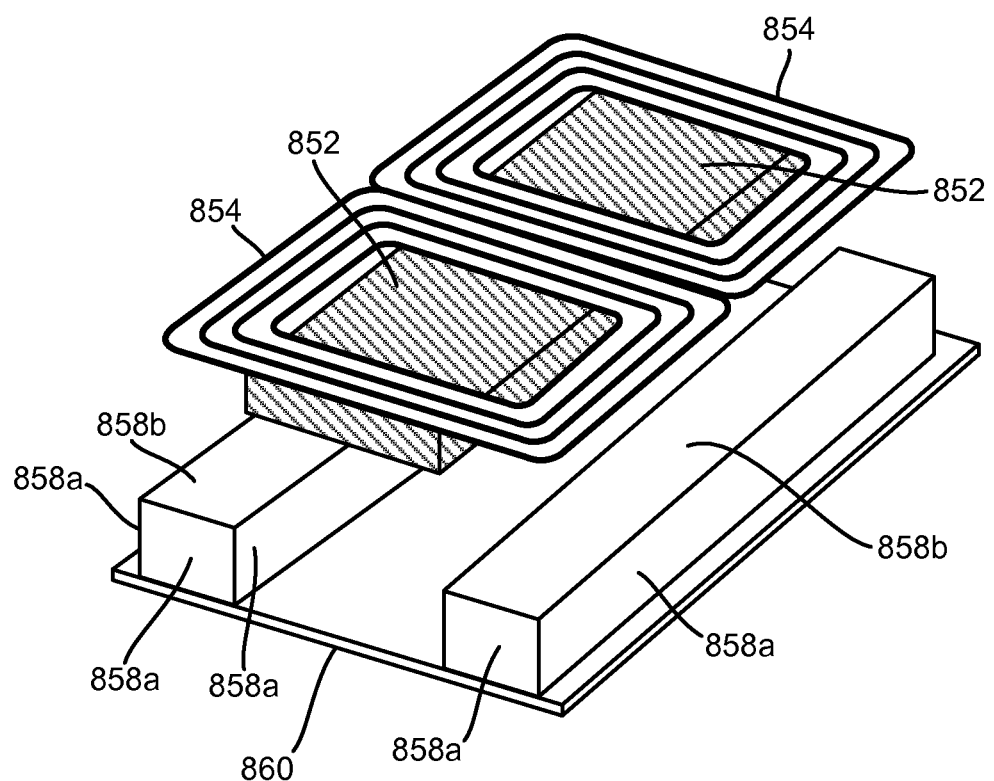
FIG. 8C is a diagram of a configuration for shielded optimized volumes along five portions of each optimized volume for electronic components in the electric vehicle charging induction coil housing of FIG. 1 in accordance with an exemplary embodiment.

FIG. 8C is a diagram of a configuration for shielded optimized volumes along five portions of each optimized volume for electronic components in the electric vehicle charging induction coil housing of FIG. 1 in accordance with an exemplary embodiment. The diagram illustrates that the optimized volumes (not illustrated) are shielded along five portions of each optimized volume with shielding members composed of a material whose qualities reduces the penetration of a magnetic field through the material. The optimized volumes are not illustrated in this diagram as the shielding members 858a, 858b obstruct the view of the optimized volumes. As illustrated, the optimized volumes include four vertical shielding members 858a along four portions of each optimized volume. Each vertical shielding member 858a can define a vertical shielding member plane substantially orthogonal to a plane defined by the electric vehicle charging induction coil 854. The optimized volumes also include a horizontal shielding member 858b along another portion of each optimized volume. Each horizontal shielding member can define a horizontal shielding member plane substantially parallel to the plane defined by the electric vehicle charging induction coil 854. Thereby, the electronic components within the optimized volume 856 can experience a reduced magnetic field relative to electronic components located in a region not enclosed with the material with reduced magnetic field penetration. Also, the optimized volumes 856 are located in a region that experiences a reduced magnetic field relative to other regions, such as but not limited to a center region 852 of the electric vehicle charging induction coil 854. Additionally, the optimized volumes can be oriented on the electric vehicle charging induction coil housing 860.

Figure 9:
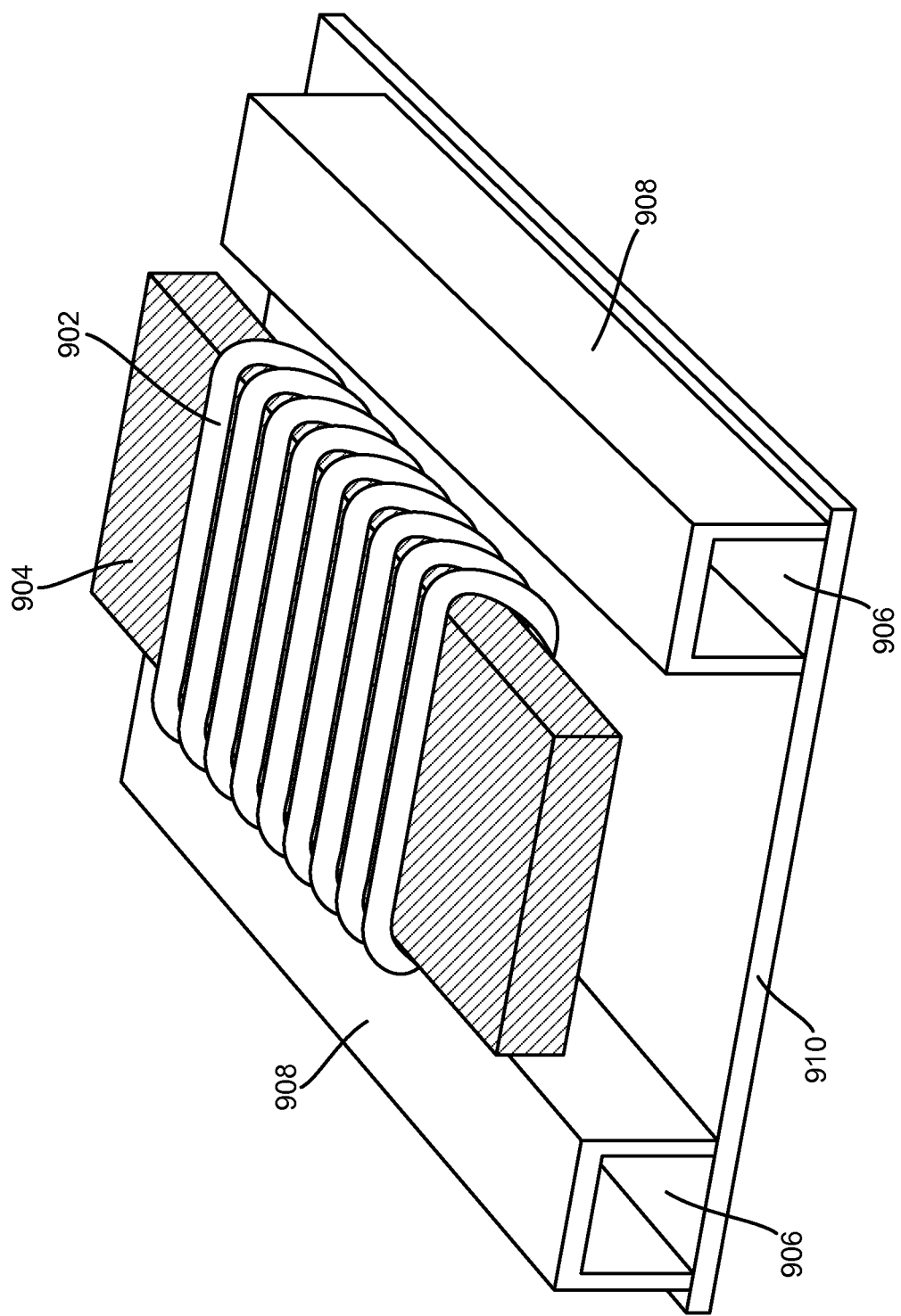
FIG. 9 is a diagram of the location of optimized volumes relative to a solenoid coil of an electric vehicle charging induction coil housing of FIG. 1 in accordance with an exemplary embodiment.

FIG. 9 is a diagram of the location of optimized volumes relative to a solenoid coil of an electric vehicle charging induction coil housing of FIG. 1 in accordance with an exemplary embodiment. The diagram illustrates that the electric vehicle charging induction coil 902 is in a solenoid form that wraps around a ferrous material 904, rather than being positioned in the configurations of FIGS. 6-8 relative to a ferrous material. Optimized volumes 906 are shielded on along three portions of each optimized volume 906 with vertical and horizontal shielding members 908 of a material that reduces the penetration of the magnetic field through the material. Also, the optimized volume 906 is located in a region that experiences a reduced magnetic field relative to other regions, such as but not limited to a center region of the electric vehicle charging induction coil 902 that includes the ferrous material 904. Additionally, the optimized volumes 906 can be oriented on the electric vehicle charging induction coil housing 910.

Figure 10:
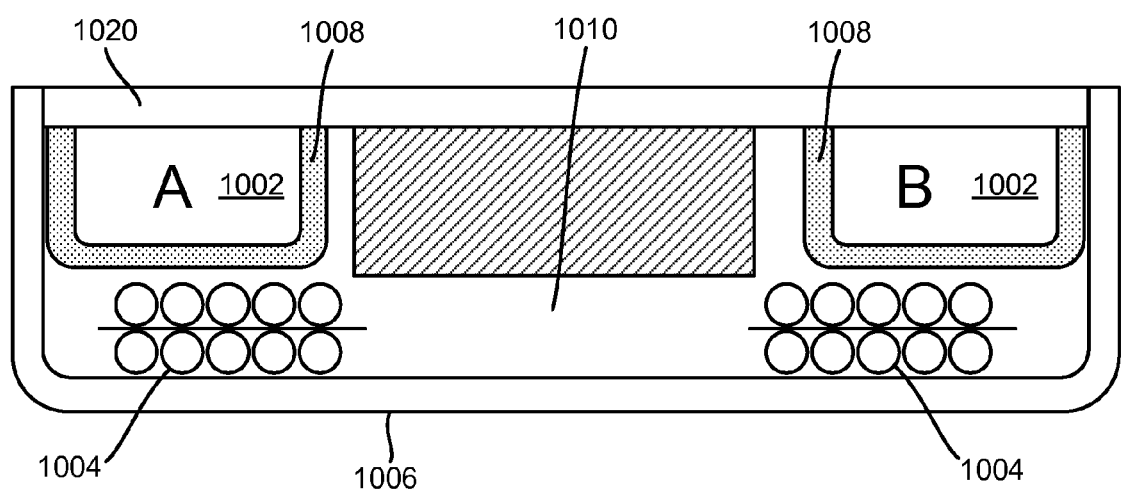
FIG. 10 is a cross-sectional diagram of the location of optimized volumes for electronic components of an electric vehicle charging induction coil housing of FIG. 1 in accordance with an exemplary embodiment.

FIG. 10 is a cross-sectional diagram of locations of optimized volumes for electronic components of an electric vehicle charging induction coil housing of FIG. 1 in accordance with an exemplary embodiment. The diagram illustrates how the optimized volumes 1002 are oriented relative to the wire of the electric vehicle charging induction coil 1004 within the electric vehicle charging induction coil housing 1006. Optimized volumes of the electric vehicle charging induction coil housing (volumes "A" and "B") 1002 are enclosed on along three portions of each optimized volume 1002 with vertical and horizontal shielding members 1008 of a material that reduces the penetration of a magnetic field through the material. Also, the optimized volume 1002 is located in a region that experiences a reduced magnetic field relative to other regions, such as but not limited to a center region 1010 of the electric vehicle charging induction coil 1004. Additionally, the optimized volumes 1002 can be oriented on the electric vehicle charging induction coil housing 1020.

Figure 11:
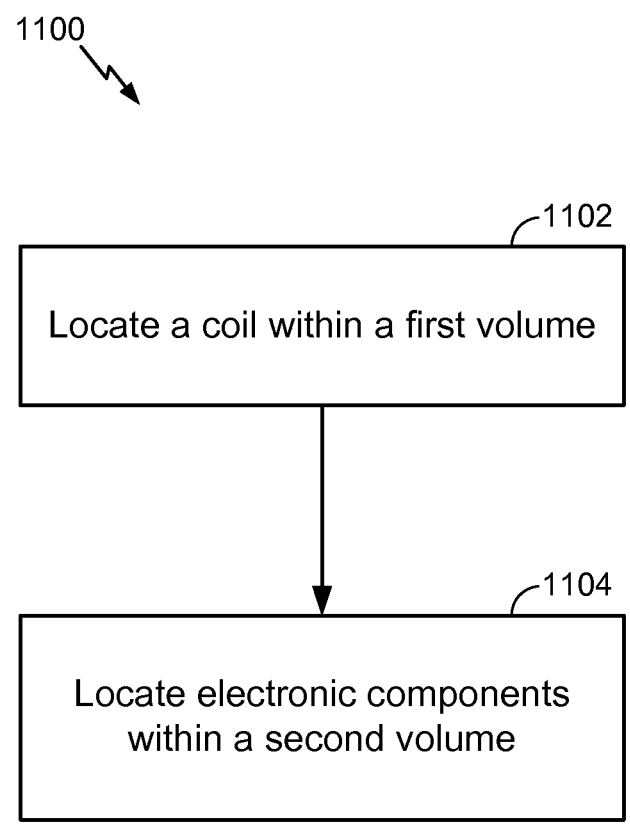
FIG. 11 is a method of assembling an electric vehicle charging induction coil housing of FIG. 6 in accordance with an exemplary embodiment.

FIG. 11 is a method of assembling an electric vehicle charging induction coil housing of FIG. 6 in accordance with an exemplary embodiment. In certain embodiments, the process 1100 can be performed by an electric vehicle charging induction coil housing 604 (FIG. 6). Although the process 1100 in FIG. 11 is illustrated in a particular order, in certain embodiments the blocks herein may be performed in a different order, simultaneously or omitted, and additional blocks can be added. A person of ordinary skill in the art will appreciate that the process of the illustrated embodiment may be implemented in any electric vehicle charging induction coil housing.

At block 1102, a coil can be located within a first volume of an electric vehicle charging induction coil housing. The coil can be configured to wirelessly receive power via a magnetic field generated by a transmitter. The wirelessly received power can be at a level sufficient for powering or charging a load.

At block 1204, electronic components can be located within a second volume of the housing. The second volume of the housing can be different than the first volume of the housing. The second volume of the housing can be bound by a horizontal shielding member along a first portion of the second volume and a vertical shielding member along a second portion of the second volume. A level of the magnetic field within the second volume can be less than the level of the magnetic field within the first volume.

Figure 12:
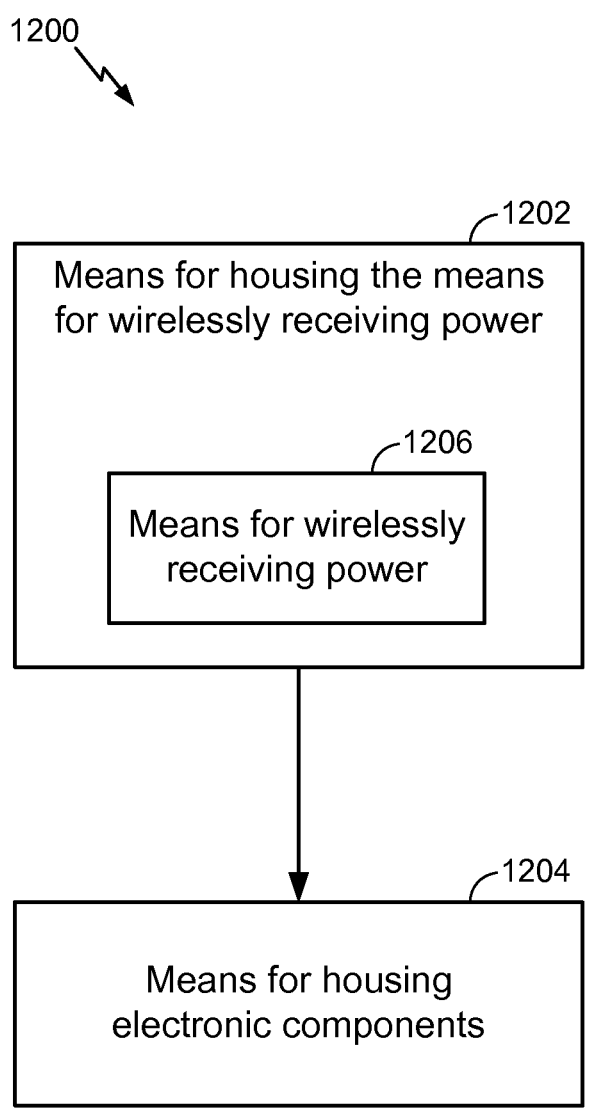
FIG. 12 is a functional block diagram of a wireless power receiver apparatus that can be employed to perform a method of FIG. 11 in accordance with an exemplary embodiment.

FIG. 12 is a functional block diagram of a wireless power receiver apparatus that can be employed to perform a method of FIG. 11 in accordance with an exemplary embodiment. The wireless power receiver apparatus 1200 can include means for wirelessly receiving power via a magnetic field generated by a transmitter 1206. The wirelessly received power can be at a level sufficient for powering or charging a load.

The wireless power receiver apparatus further includes means for housing 1202 the means for wirelessly receiving power 1206. In certain embodiments, the means for housing 1202 the means for wirelessly receiving power 1206 can be configured to perform one or more of the functions described above with respect to block 1102 (FIG. 11). In various embodiments, the means for housing 1202 the means for wirelessly receiving power 1206 can include an electric vehicle charging induction coil housing 604 (FIG. 6).

The wireless power receiver apparatus further includes means for housing electronic components 1204. The level of the magnetic field within the means for housing electronic components 1204 can be less than the level of the magnetic field within the means for housing 1202 the means for wirelessly receiving power 1206. In certain embodiments, the means for housing electronic components 1204 can be configured to perform one or more of the functions described above with respect to block 1104 (FIG. 11). In various embodiments, the means for housing electronic components 1204 can include an electric vehicle charging induction coil housing 604 (FIG. 6).

Although specific configurations of optimized volumes for electronic components are discussed above, optimized volumes can be configured in many different ways in accordance with different embodiments. For example, although the optimized volumes are shown in FIGS. 8A-10 as being shielded along two or three portions of the optimized volumes with vertical and/or horizontal shielding members, optimized volumes can enjoy the benefit of any amount of shielding sufficient to protect electronic components within the optimized volumes from a magnetic field without significantly affecting the flow of the magnetic flux for charging (such as but not limited to by varying the number or size of the shielding) in accordance with various embodiments.

Aspects of the integration of printed circuit boards within optimized volumes are discussed below.

Integrated Printed Circuit Boards within Optimized Volumes

Typically, space within electric vehicle charging induction coil housing is limited, which can also limit integration of electronic components within an optimized volume. In certain embodiments, a multilayered printed circuit board can be utilized within an electric vehicle charging induction coil housing to integrate the electronic components with each other and with the electric vehicle charging induction coil housing as a whole. Furthermore, multi-layered printed circuit boards can be utilized to create capacitor structures (between printed circuit board layers), and/or to provide a flat interconnection between the electronic components located within different optimized volumes of an electric vehicle charging induction coil housing. These capacitor structures can be created from the plane layers of a printed circuit board due to the parasitic capacitance of the printed circuit board as the positive voltage plane and the ground plane layers are substantially parallel to one another, forming a capacitor.

Figure 13:
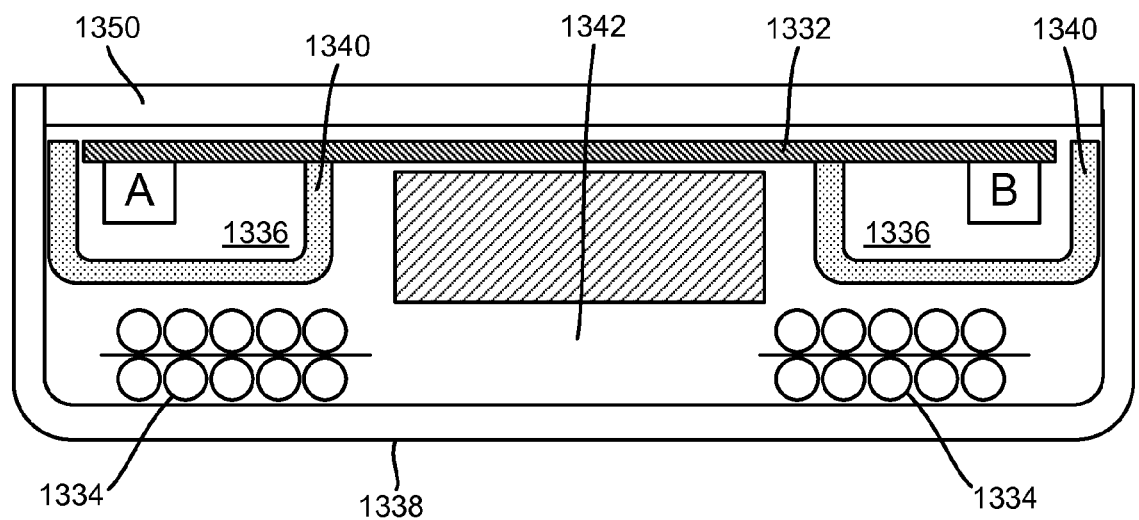
FIG. 13 is a cross-sectional diagram of the location of optimized volumes for electronic components with capacitors integrated within a printed circuit board of an electric vehicle charging induction coil housing of FIG. 1 in accordance with an exemplary embodiment.

FIG. 13 is a cross-sectional diagram of the location of optimized volumes for electronic components with capacitors integrated within a printed circuit board of an electric vehicle charging induction coil housing of FIG. 1 in accordance with an exemplary embodiment. In the illustrated embodiment, the electronic components within a single or multiple optimized volumes 1336 can be interconnected by sharing a printed circuit board 1332. Regions of the printed circuit board 1332 can also be implemented as capacitors (such as but not limited to tuning and DC blocking capacitors) by taking advantage of the parasitic capacitance of a multi-layered printed circuit board. In certain embodiments, the printed circuit board comprises a metal layer used to form the capacitors (such as but not limited to tuning and DC blocking capacitors) of the electronic components. Also, similar to FIG. 10, the diagram illustrates how the optimized volumes 1336 are oriented relative to the wire of the electric vehicle charging induction coil 1334 within the electric vehicle charging induction coil housing 1338. Optimized volumes 1336 of the electric vehicle charging induction coil housing (volumes "G" and "H") are enclosed along three portions of each optimized volume with shielding members 1340 of a material that reduces the penetration of a magnetic field through the material. Also, the optimized volumes 1336 are located in a region that experiences a reduced magnetic field relative to other regions, such as but not limited to a center region 1342 of the electric vehicle charging induction coil 1334. Additionally, the optimized volumes 1336 can be oriented on the electric vehicle charging induction coil housing 1350.

Although specific configurations integrating a printed circuit board with electronic components within an optimized volume are discussed above, printed circuit boards can be integrated with electronic components in many different ways in accordance with different embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of certain embodiments have been described herein. It is to be understood that not necessarily all such advantages may be achieved in accordance with any particular embodiment. Thus, the embodiments may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the application. Thus, the present application is not intended to be limited to the embodiments shown herein but is to be accorded the widest scope consistent with the principles and novel features disclosed herein.

What is claimed is:

1. A wireless power receiver apparatus, comprising:
a coil configured to wirelessly receive power via a magnetic field generated by a transmitter, the wirelessly received power at a level sufficient for powering or charging a load; and
a housing comprising:
a first volume configured to house the coil; and
a second volume different than the first volume and configured to house electronic components, a level of the magnetic field within the second volume being less than the level of the magnetic field within the first volume, the second volume bound by:
a horizontal shielding member along a first portion of the second volume, the horizontal shielding member defining a horizontal shielding member plane substantially parallel to a plane defined by the coil, and
a vertical shielding member along a second portion of the second volume, the vertical shielding member defining a vertical shielding member plane substantially orthogonal to the plane defined by the coil,
wherein the horizontal and vertical shielding members are configured to reduce the level of the magnetic field between the first volume and the second volume.

2. The wireless power receiver apparatus of claim 1, comprising a third volume different than the first and second volumes, the third volume configured to house electronic components, a level of the magnetic field within the third volume being less than the level of the magnetic field within the first volume, the third volume bound by a third volume horizontal shielding member along a first portion of the third volume, the third volume horizontal shielding member defining a third volume horizontal shielding member plane substantially parallel to the plane defined by the coil, and a third volume vertical shielding member along a second portion of the third volume, the third volume vertical shielding member defining a third volume vertical shielding member plane substantially orthogonal to the plane defined by the coil.

3. The wireless power receiver apparatus of claim 2, wherein the electronic components are operably connected via a printed circuit board.

4. The wireless power receiver apparatus of claim 3, wherein the printed circuit board comprises at least two layers, where regions of the printed circuit board are used as tuning and DC blocking capacitors of the electronic components.

5. The wireless power receiver apparatus of claim 4, wherein the printed circuit board comprises a metal layer used to form the tuning and DC blocking capacitors of the electronic components.

6. The wireless power receiver apparatus of claim 1, wherein the second volume is bound by a printed circuit board that interfaces with the electronic components along a third portion of the second volume.

7. The wireless power receiver apparatus of claim 1, wherein the second volume is at a location disposed radially from an outer perimeter of the coil.

8. The wireless power receiver apparatus of claim 1, wherein the horizontal shielding member and the vertical shielding member comprises a material whose qualities reduce the penetration of a magnetic field through the material.

9. The wireless power receiver apparatus of claim 8, wherein the second volume is bound by another vertical shielding member along a third portion of the second volume, the another vertical shielding member defining an another vertical shielding member plane substantially orthogonal to the plane defined by the coil, the another vertical shielding member comprising a material whose qualities reduce the penetration of a magnetic field through the material.

10. The wireless power receiver apparatus of claim 9, wherein the second volume is bound all along the second volume by shielding members, each shielding member comprising a material whose qualities reduce the penetration of a magnetic field through the material.

11. The wireless power receiver apparatus of claim 1, wherein the coil is an electric vehicle charging induction coil.

12. The wireless power receiver apparatus of claim 1, wherein the housing is an electric vehicle charging induction coil housing.

13. A wireless power receiver apparatus, comprising:
means for wirelessly receiving power via a magnetic field generated by a transmitter, the wirelessly received power at a level sufficient for powering or charging a load; and
means for housing a first volume and a second volume different from the first volume, the first volume comprising the means for wirelessly receiving power and the second volume configured to house electronic components, a level of the magnetic field within the second volume being less than a level of the magnetic field within the first volume;
first means for shielding the magnetic field along a first portion of the second volume in a plane substantially parallel to a plane defined by the means for wirelessly receiving power; and
second means for shielding the magnetic field along a second portion of the second volume in a plane substantially orthogonal to the plane defined by the means for wirelessly receiving power,
wherein the first and second means for shielding are configured to reduce the level of the magnetic field between the first volume and the second volume.

14. The wireless power receiver apparatus of claim 13, comprising an additional means for housing electronic components, a level of the magnetic field within the additional means for housing electronic components being less than the level of the magnetic field within the means for housing the means for wirelessly receiving power.

15. The wireless power receiver apparatus of claim 14, wherein the electronic components are operably connected via a printed circuit board.

16. The wireless power receiver apparatus of claim 15, wherein the printed circuit board comprises at least two layers, where regions of the printed circuit board are used as tuning and DC blocking capacitors of the electronic components.

17. A method for forming a housing, comprising:
locating a coil within a first volume of the housing, the coil configured to wirelessly receive power via a magnetic field generated by a transmitter, the wirelessly received power at a level sufficient for powering or charging a load; and locating electronic components within a second volume of the housing different than the first volume of the housing, a level of the magnetic field within the second volume being less than the level of the magnetic field within the first volume, the second volume bound by:
a horizontal shielding member along a first portion of the second volume, the horizontal shielding member defining a horizontal shielding member plane substantially parallel to a plane defined by the coil, and
a vertical shielding member along a second portion of the second volume, the vertical shielding member defining a vertical shielding member plane substantially orthogonal to the plane defined by the coil,
wherein the horizontal and vertical shielding members are configured to reduce the level of the magnetic field between the first volume and the second volume.

18. The method of claim 17, comprising locating electronic components within a third volume of the housing different than the first and second volumes of the housing, a level of the magnetic field within the third volume being less than the level of the magnetic field within the first volume, the third volume bound by a third volume horizontal shielding member along a first portion of the third volume, the third volume horizontal shielding member defining a third volume horizontal shielding member plane substantially parallel to the plane defined by the coil and a third volume vertical shielding member along a second portion of the third volume, the third volume vertical shielding member defining a third volume vertical shielding member plane substantially orthogonal to the plane defined by the coil.

19. The method of claim 18, wherein the electronic components are operably connected via a printed circuit board.

20. The method of claim 18, wherein the printed circuit board comprises at least two layers, where regions of the printed circuit board are used as tuning and DC blocking capacitors of the electronic components.

21. The method of claim 20, wherein the printed circuit board comprises a metal layer used to form the tuning and DC blocking capacitors of the electronic components.

22. The method of claim 17, wherein the second volume is bound by a printed circuit board that interfaces with the electronic components along a third portion of the second volume.

23. The method of claim 17, wherein the second volume is at a location disposed radially from an outer perimeter of the coil.

24. The method of claim 17, wherein the horizontal shielding member and the vertical shielding member comprises a material whose qualities reduce the penetration of a magnetic field through the material.

25. The method of claim 24, wherein the second volume is bound by another vertical shielding member along a third portion of the second volume, the another vertical shielding member defining an another vertical shielding member plane substantially orthogonal to the plane defined by the coil, the another vertical shielding member comprising a material whose qualities reduce the penetration of a magnetic field through the material.

26. The method of claim 25, wherein the second volume is bound all along the second volume by shielding members, each shielding member comprising a material whose qualities reduce the penetration of a magnetic field through the material.

27. The method of claim 17, wherein the coil is an electric vehicle charging induction coil.

28. The method of claim 17, wherein the housing is an electric vehicle charging induction coil housing.

* * * * *